US007244905B2

(12) United States Patent
Das et al.

(10) Patent No.: US 7,244,905 B2
(45) Date of Patent: Jul. 17, 2007

(54) METHOD FOR ESTIMATING NUGGET DIAMETER AND WELD PARAMETERS

(75) Inventors: Manohar Das, Rochester Hills, MI (US); James W. Strausbaugh, Clarkston, MI (US); Vernon Fernandez, Rochester Hills, MI (US); Gerald Grzadzinski, Sterling Heights, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 11/148,733

(22) Filed: Jun. 9, 2005

(65) Prior Publication Data

US 2006/0278616 A1 Dec. 14, 2006

(51) Int. Cl.
*B23K 11/25* (2006.01)
(52) U.S. Cl. .................................................... 219/109
(58) Field of Classification Search ................ 219/109, 219/110
See application file for complete search history.

(56) References Cited

U.S. PATENT DOCUMENTS

| | | | | |
|---|---|---|---|---|
| 4,596,917 A | * | 6/1986 | Nied et al. | 219/109 |
| 5,343,011 A | * | 8/1994 | Fujii et al. | 219/109 |
| 5,450,315 A | * | 9/1995 | Stefanski | 219/110 |
| 5,764,859 A | * | 6/1998 | Kim et al. | 219/109 |
| 5,892,197 A | * | 4/1999 | Goto et al. | 219/110 |
| 6,018,729 A | * | 1/2000 | Zacharia et al. | 219/110 |
| 6,130,396 A | | 10/2000 | Hasegawa et al. | |
| 6,140,825 A | * | 10/2000 | Fujii et al. | 219/110 |
| 6,506,997 B2 | * | 1/2003 | Matsuyama | 219/110 |
| 6,518,536 B2 | * | 2/2003 | Fujii et al. | 219/110 |
| 2004/0073319 A1 | * | 4/2004 | Monari | 700/14 |

OTHER PUBLICATIONS

Garza and M. Das, "On Real Time Monitoring and Control of Resistance Spot Welds Using Dynamic Resistance Signatures," Proceedings of IEEE Midwest Symposium on Circuits and Systems, Jun. 2001.
Welding Handbook, Fourth Edition, Section Two, vol. 2, "Gas, Arc and Resistance Welding Processes," Edited by Arthur L. Phillips, American Welding Society, New York, 1957-1962.
S. A. Gedeon, C. D. Sorenson, K. T. Ulrich, and T. W. Eager, "Measurment of dynamic electrical and mechanical properties of resistance spot welds," *Welding Journal*, vol. 66, #12, pp. 378s-385s, Dec. 1987.
F. Garza and M. Das, "Indentification of time-varying resistance during welding," Proceedings of IEEE IMTC conference, Baltimore, Maryland, 2000.
W. Li, S. Cheng, S. J. Hu and J. Shriver, "Statistical investigation on resistance spot welding quality using a two-state, sliding-level experiment," Journal of manufacturing Science and Engineering, vol. 123, Aug. 2001, pp. 513-520.

\* cited by examiner

*Primary Examiner*—Clifford C. Shaw
(74) *Attorney, Agent, or Firm*—Ralph E. Smith

(57) ABSTRACT

A method for estimating weld nugget diameter includes receiving current and voltage inputs, a time input, and a force input. In certain embodiments, the method also uses other weld parameters including type of material, type of stack, stack thickness, applied force, preheat current, RMS value of weld current, weld level, and weld time. The method further determines a resistance curve based on the current and voltage inputs, and time input. It also derives parameters from the resistance curve, and determines a weld nugget diameter estimate based on both resistance parameters.

16 Claims, 7 Drawing Sheets

METHOD FOR ESTIMATING NUGGET DIAMETER AND WELD PARAMETERS

FIELD OF THE INVENTION

The invention relates to weld controllers, and more particularly to estimating the diameter of a weld nugget, and estimating weld parameters in response to particular weld nugget characteristics.

BACKGROUND OF THE INVENTION

One estimate of weld strength is the diameter of the nugget formed by the weld. Prior art attempts to estimate the diameter of a nugget created by a weld have focused on certain weld parameters, such as, current, voltage, applied force, and weld time. Other attempts have attempted to measure resistance across a weld nugget. Other attempts require the utilization and destruction of many workpieces, requiring significant material and labor expense. Continuous online estimation of dynamic resistance has been considered difficult due to inductive noise. Furthermore, the nugget diameter will vary depending on the type of controller, and type of welding strategy used.

It is therefore desirable to provide a method of estimating weld nugget diameter that overcomes these disadvantages.

SUMMARY OF THE INVENTION

One exemplary embodiment of the invention provides a method for estimating weld nugget diameter. The method includes receiving a time input, receiving current and voltage inputs, and receiving a force input. The method further determines a resistance curve based on the current and voltage inputs, and time input; and determines a weld nugget diameter estimate based on parameters derived from the resistance curve Another exemplary embodiment of the invention provides a method for estimating weld nugget diameter by operating a neural network. The method includes receiving a time input, receiving current and voltage inputs, and receiving a force input; and determining a resistance curve based on the current and voltage inputs. It further includes operating a neural network based on parameters derived from the resistance; and providing a nugget size estimate responsive to the operation.

Yet another exemplary embodiment of the invention provides a method for estimating weld parameters. The method includes receiving a degree of expulsion input, receiving a desired nugget diameter input, receiving a desired shear strength input, and receiving a limit of indentation input. The method further includes, operating a neural network based on the inputs and providing weld parameter outputs responsive to the operation.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its applications, or uses.

Figure 1:
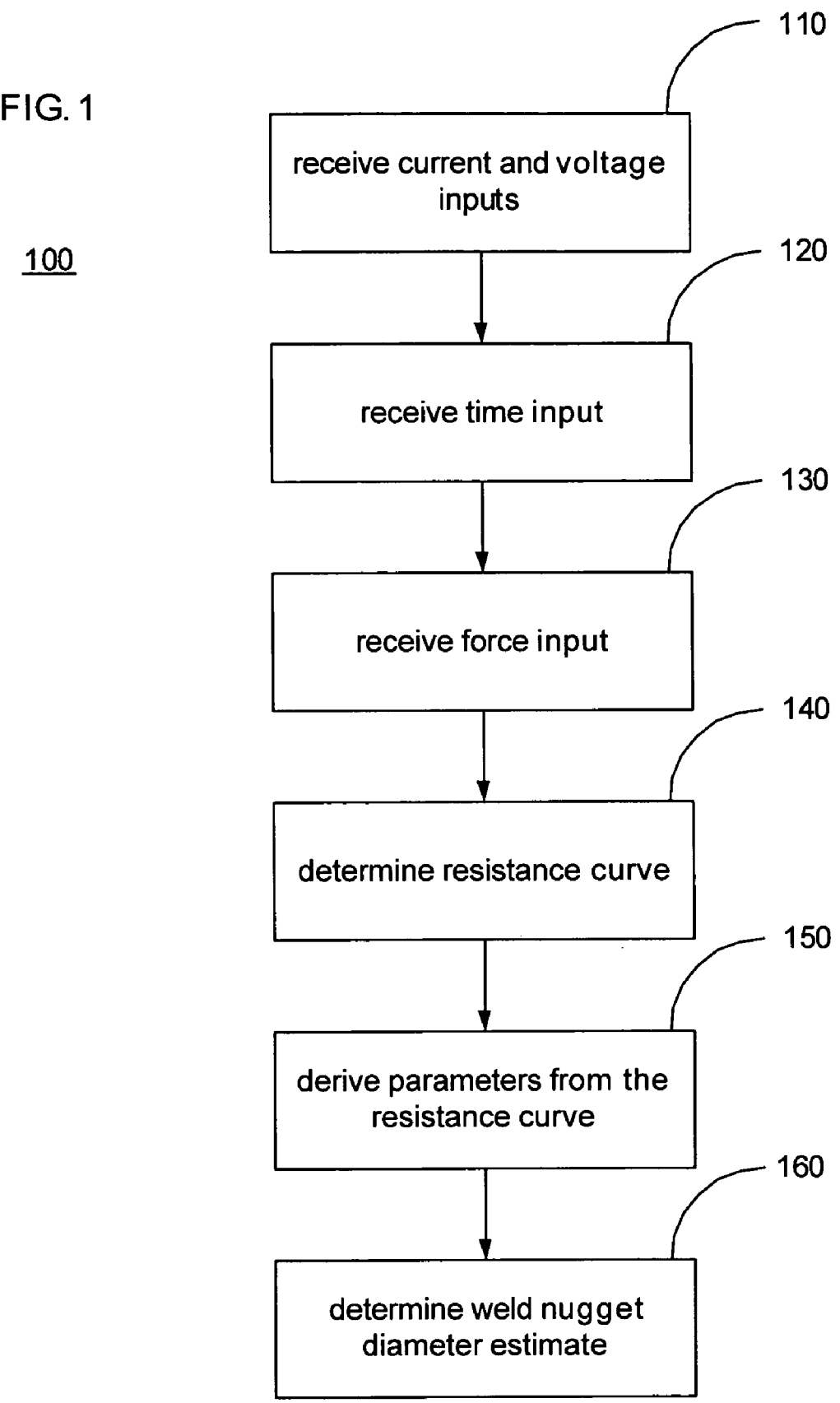
FIG. 1 illustrates an exemplary embodiment of a method for determining a weld nugget diameter estimate in accordance with the present invention.

Turning now to the drawings, FIG. 1 illustrates a method 100 for estimating nugget diameter in accordance with an exemplary embodiment of the present invention. Method 100 begins at 110 by receiving a current input and a voltage input. The current and voltage inputs are measurements of the current and voltage, respectively, applied across a forming weld nugget. A time input is received at step 120. A time input is an estimation of the time elapsed since the start of the current welding operation. A force input is received at 130. A force input is an estimation of the weld force applied during the current welding operation.

Figure 7:
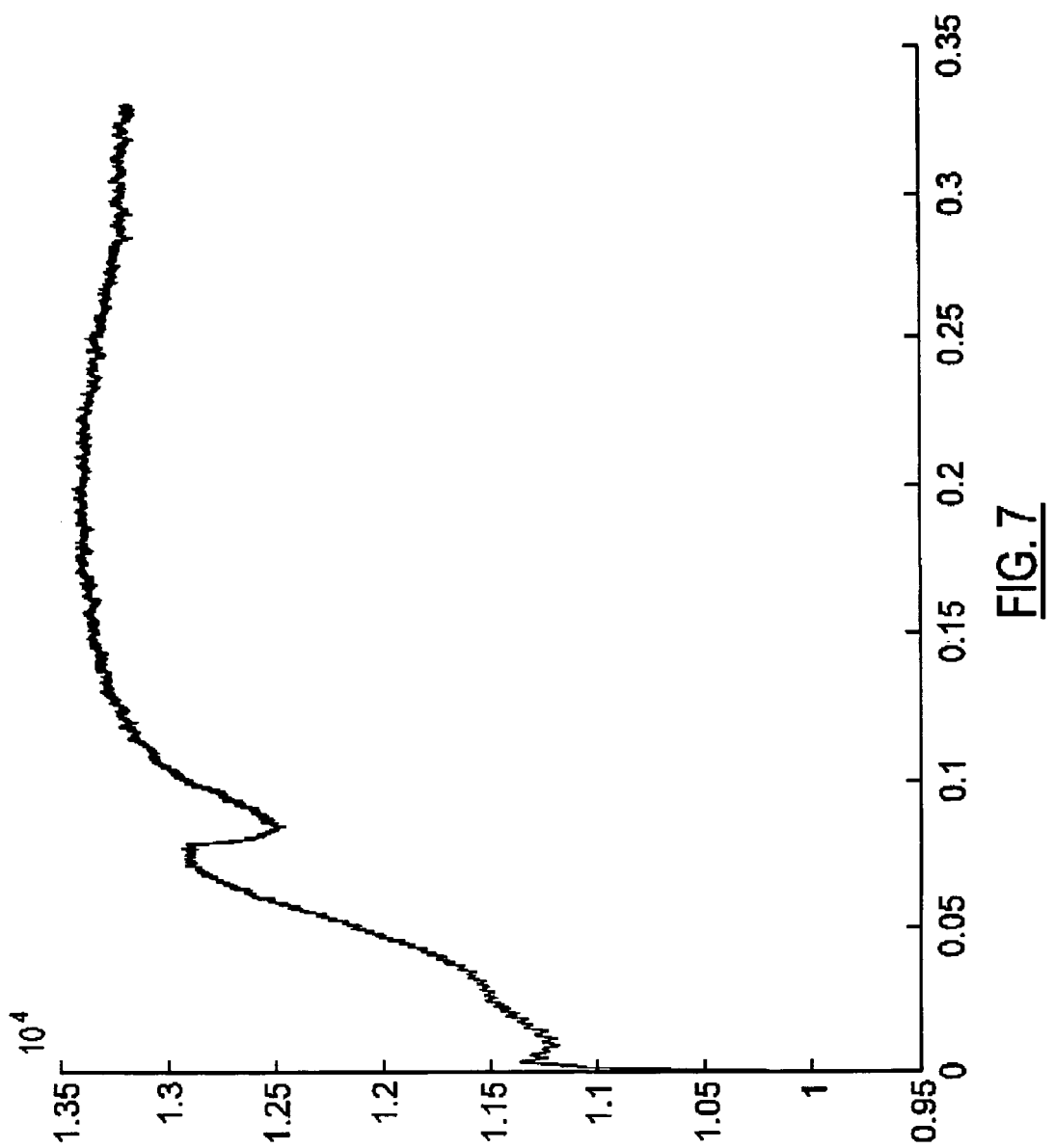
FIG. 7 is a graph of resistance over time in a welding operation.

A resistance curve is determined at 140. The resistance curve is determined based on the voltage, current, and time inputs. A resistance curve charts the amount of resistance across the work piece as a function of time. An example of a resistance curve is displayed in FIG. 7.

Accordingly, in one implementation, a method for estimating weld nugget diameter includes receiving current and voltage inputs, receiving a time input, receiving a force input, determining a resistance curve based on the current and voltage inputs, the time input and the force input, deriving weld parameters from the resistance curve; and determining a weld nugget diameter estimate based on weld parameters derived from the resistance curve.

In step 150, parameters are derived from the resistance curve to hone a model for estimating weld nugget diameter. In an exemplary embodiment, for a MFDC controller utilizing constant current welding strategies, the derived parameters include maximum resistance, minimum resistance, time when maximum resistance is attained, the difference between maximum and minimum resistance, area underneath the resistance curve, slope of the resistance curve, steady state value of resistance, and the difference between maximum resistance and steady state value of resistance. In a second exemplary embodiment, other weld parameters are utilized. Other weld parameters may include, for example, the type of stack, type of material (e.g., bare steel, galvanized steel, aluminum, etc.) to be welded, stack thickness, weld cap diameter, applied force, preheat current, RMS value of current, and weld time. In other exemplary embodiments, a correction factor due to increased cap diameter resulting from the number of welds performed is included as a weld parameter.

In one embodiment, recursive least squares analysis is applied to the data to reduce the level of inductive noise. Other filtering schemes may be applied to the data to reduce noise in other embodiments. In another embodiment, for a MFDC controller utilizing constant heat control welding strategies, the parameters include maximum resistance, weld time, preheat weld current, applied force, weld level, stack thickness, RMS value of the current, energy delivered, RMS value of the resistance, time when resistance reaches maximum resistance, the ratio of maximum resistance to initial resistance, steady state value of resistance, the difference between maximum resistance and steady state resistance, the difference between maximum resistance and initial resistance, and heat. Other parameters may be extracted from the resistance curve.

In response to the determined parameters from the resistance curve, a weld nugget diameter is estimated at 160. In one embodiment, the estimation of weld nugget diameter includes a model of the form:

$$\text{Diameter}_{Estimated} = a_0 + a_1 * F + a_2 * \text{Rarea} + a_3 * R_{max} + a_4 * R_{slope} + a_5 * t_{max} + a_6 * R_{inc} + a_7 * R_{drop} + a_8 * ts + a_9 * R_{steady}$$

wherein $a_1, a_2, \ldots, a_9$, denote constants that depend on both controller type and control strategy, F equals the applied force, $R_{area}$ equals the area underneath the resistance curve, $R_{max}$ equals the maximum resistance, $R_{slope}$ equals the maximum negative slope of the resistance curve, tmax equals the time when resistance attains maximum resistance, $R_{steady}$ equals the steady state value of the resistance, $R_{inc}$ equals the difference between $R_{max}$ and $R_{min}$, $R_{drop}$ equals the difference between $R_{max}$ and $R_{steady}$, and $t_s$ equals the time when resistance attains $R_{steady}$.

For example, the values of the above constants for one model of a MFDC controller using a constant current control strategy are given by:

$$a_0 = -0.05152, \ a_1 = 0.00032, \ a_2 = 0.00028, \ a_3 = 0.00061, \ a_4 = 0.000003,$$

$$a_5 = 0.48327, \ a_6 = 0.00041, \ a_7 = 0.000182, \ a_8 = -0.10936, \ a_9 = 0.00008.$$

In another embodiment, the estimation of nugget size is performed in two steps. First, a linear model of the following form is used to estimate the probability of a stick weld:

$$\text{Stick-weld probability} = b_0 + b_1 * p_1 + b_2 * p_2 + \ldots + b_m * p_m$$

wherein $b_0, b_1, \ldots, b_m$ are constants and $p_0, p_1, \ldots, p_m$ denote values of the weld parameter settings.

If the above probability is more than 50%, it is declared to be a stick weld. If it is less than 50%, it is not a stick-weld and a model of the following form is used to estimate the actual nugget diameter:

$$\text{Diameter}_{Estimated} = c_0 + c_1 * f_1 + c_2 * f_2 + \ldots + c_n * f_n$$

wherein $c_0, c_1, \ldots, c_n$ are constants and $f_0, f_1, \ldots, f_n$ denote parameters derived from the resistance curve as well as other weld parameters.

As an example, for a MFDC controller utilizing a constant heat control strategy, the following equation is used to estimate the probability of a stick weld:

$$\text{Stick-weld probability} = 7.9117 - 3.025 * T - 0.1124 * Ipre - 0.56 * EL + 0.0737 * h - 0.0007 * Irms,$$

wherein T equals weld time expressed in msec, Ipre equals the preheat weld current, EL equals the weld level, h equals the stack thickness and Irms equals the root mean square (RMS) value of the current.

Also, for non-stick welds, the equation used to estimate the actual nugget diameter is given by:

$$\text{Diameter}_{Estimated} = 6.5122 - 4.8734 * T + 0.1744 * Ipre + 0.4681 * EL - 0.0004 * Fap + 0.0061 * h - 0.000002 * Irms - 0.0015 * E - 10367 * Rrms + 1.8006 * tR\max - 2.8847 * Rg + 6985.1 * R\text{drop} + 13420 * \text{Rarea} + 34385 * Rinc + 0.0013586 * \text{heat}$$

wherein T equals weld time, Ipre equals the preheat weld current, Fap equals the applied force, h equals the stack thickness, Irms equals the RMS value of the current, E equals the energy delivered to the nugget, Rrms equals the RMS value of the resistance, tRmax equals the time when resistance reaches the maximum level of resistance, Rg equals the ratio of maximum resistance to initial resistance, Rdrop equals the difference between maximum resistance and steady state resistance, Rarea equals the area underneath the resistance curve, Rinc equals the difference between maximum resistance and initial resistance, and heat equals the product of the square of the RMS value of the current and Rarea.

The final estimate may also include a correction factor due to increased cap diameter resulting from the number of welds performed.

Figure 2:
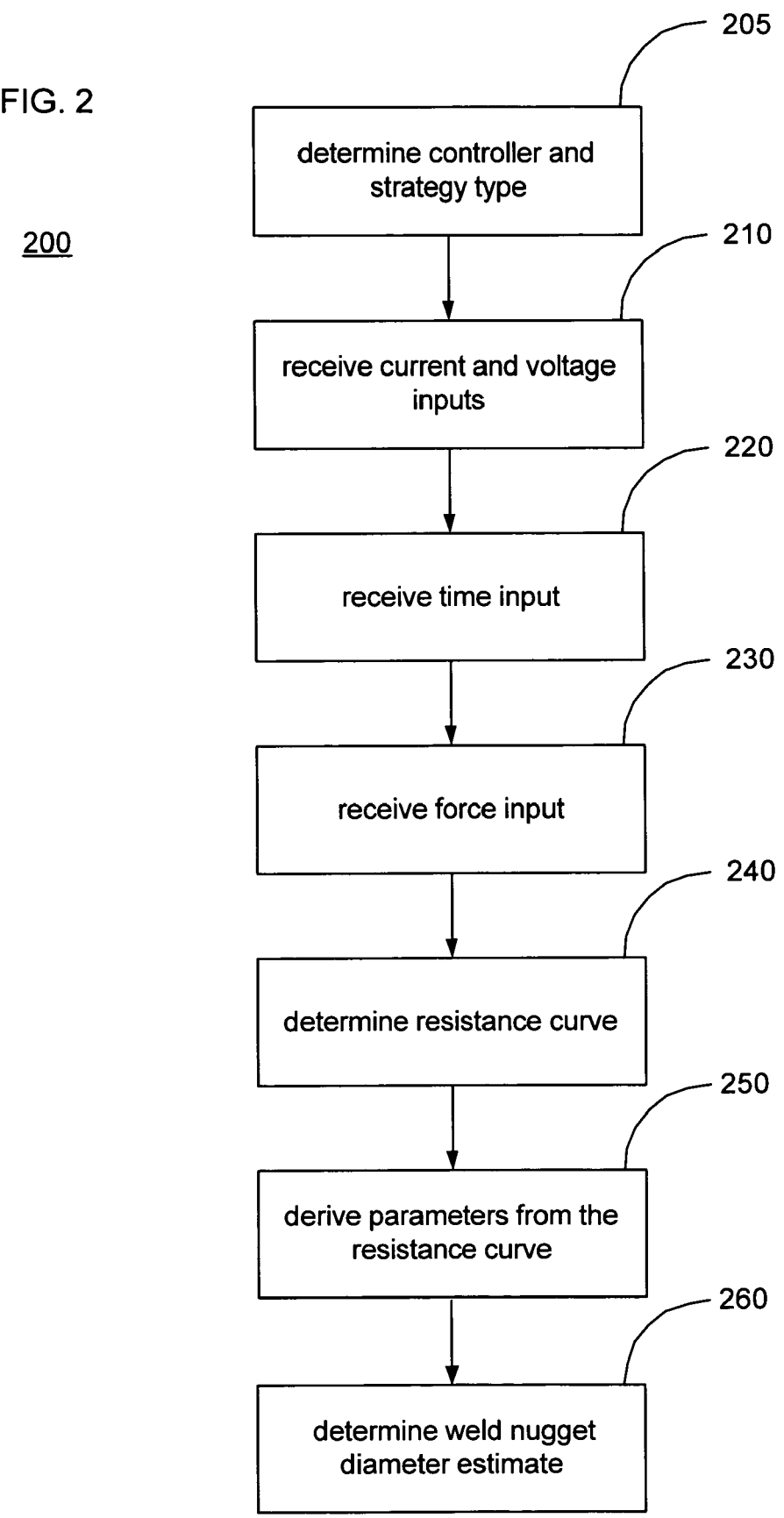
FIG. 2 illustrates an alternative exemplary embodiment of a method for determining a weld nugget diameter estimate in accordance with the present invention.

FIG. 2 illustrates another exemplary embodiment of a method 200 for estimating weld nugget diameter in accordance with the present invention. Method 200 begins at 205 by determining the controller and weld strategy type used for the weld. The characteristics of a particular weld are governed, at least in part, by the controller (i.e. AC, MFDC, etc.) and weld strategy (i.e. constant heat, constant current, constant voltage, etc.) employed for the weld.

In one embodiment, the model used to determine weld nugget diameter is a function of the combination of controller and strategy. For example, one weld station utilizes two types of controller (for example, CHC and MFDC) and three types of control strategy (for example, constant heat, constant current, constant voltage). In such a station, 6 separate models would be used to model nugget diameter depending on the combination. Thus, in one embodiment, modeling the weld nugget diameter is made in response to the determination of the controller and strategy combination.

Method 200 continues at step 210 and both current and voltage inputs are received. In one embodiment, step 210 is implemented as in step 110. A time input is received at 220, and in one embodiment, step 220 is implemented as in step 120. A force input is received at 230, and in one embodiment, step 230 is implemented as in step 130. At step 240, a resistance curve is determined from current, voltage and time inputs, and in one embodiment, step 240 is implemented as in step 140.

At step 250, parameters are derived from the resistance curve, and in one embodiment, step 250 is implemented as in step 150. At step 260, a weld nugget diameter estimate is determined, and in one embodiment, step 260 is implemented as in step 160. The weld nugget diameter estimation is based on parameters derived from the resistance curve as well as other weld parameters. The final estimate of nugget diameter may also include a correction factor due to increased cap diameter resulting from the number of welds performed.

Figure 3:
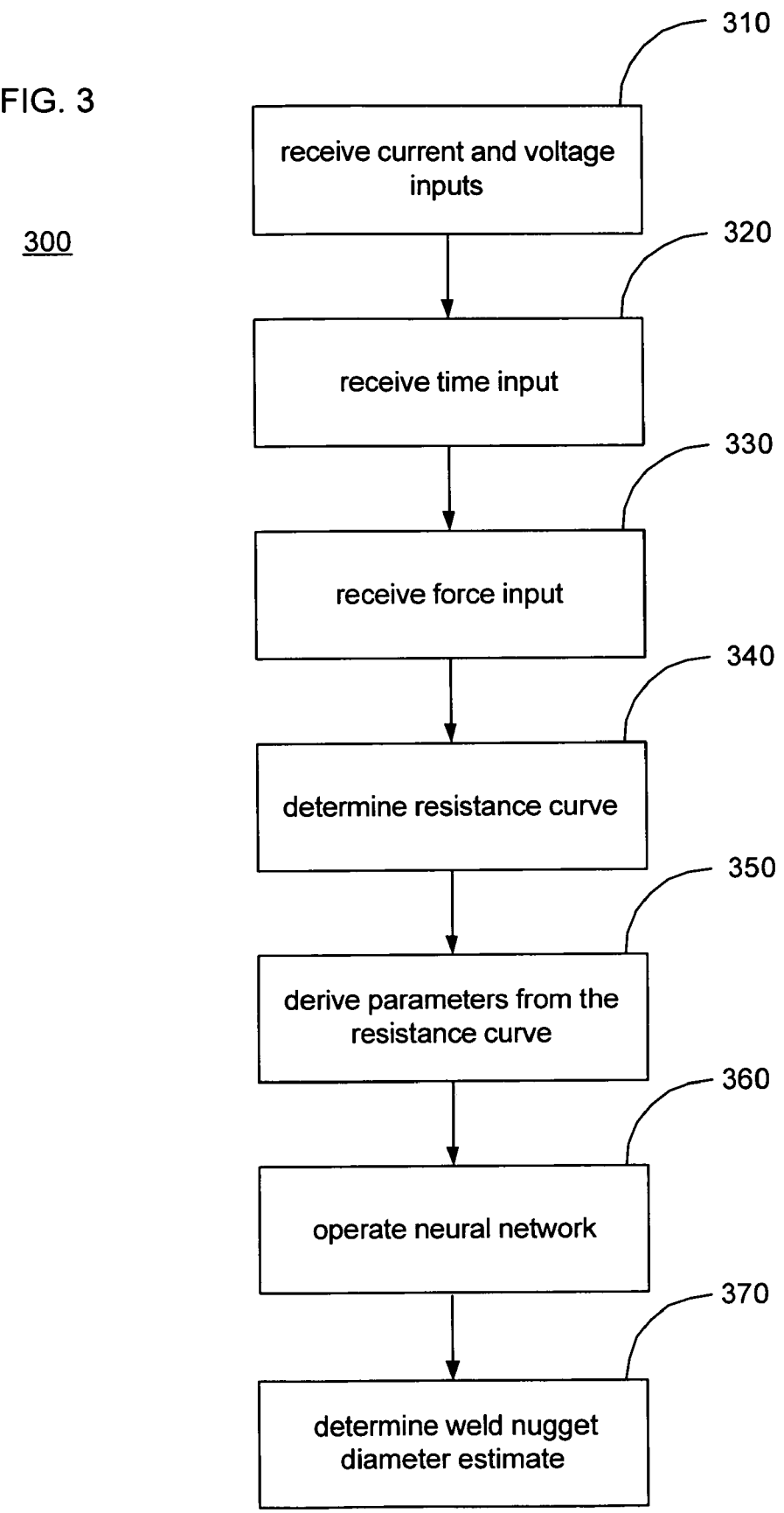
FIG. 3 illustrates an alternative exemplary embodiment of a method for determining a weld nugget diameter estimate in accordance with the present invention.

FIG. 3 illustrates one embodiment of a method 300 for estimating nugget diameter in accordance with one aspect of the invention. Method 300 begins at 310 by receiving current and voltage inputs.

A time input is received at step 320, a force input is received at step 330, a resistance curve is determined at step 340, and from the resistance curve, parameters are derived in step 350. In one embodiment, step 310 is implemented as in step 110, step 320 is implemented as in step 120, step 330 is implemented as in step 130, step 340 is implemented as in step 140, and step 350 is implemented as in step 150.

Based on the above parameters, a neural network is operated in step 360. In one embodiment, the neural network also uses some weld parameters as additional inputs. These include joint type, the type of material (e.g., bare steel, galvanized steel, aluminum, etc.) to be welded, stack thickness, weld cap diameter, applied force, preheat current, rms value of current, and weld time.

The output layer of the neural network provides an estimate of the nugget diameter in step 370. The final estimate may also include a correction factor due to increased cap diameter resulting from the number of welds performed.

Figure 4:
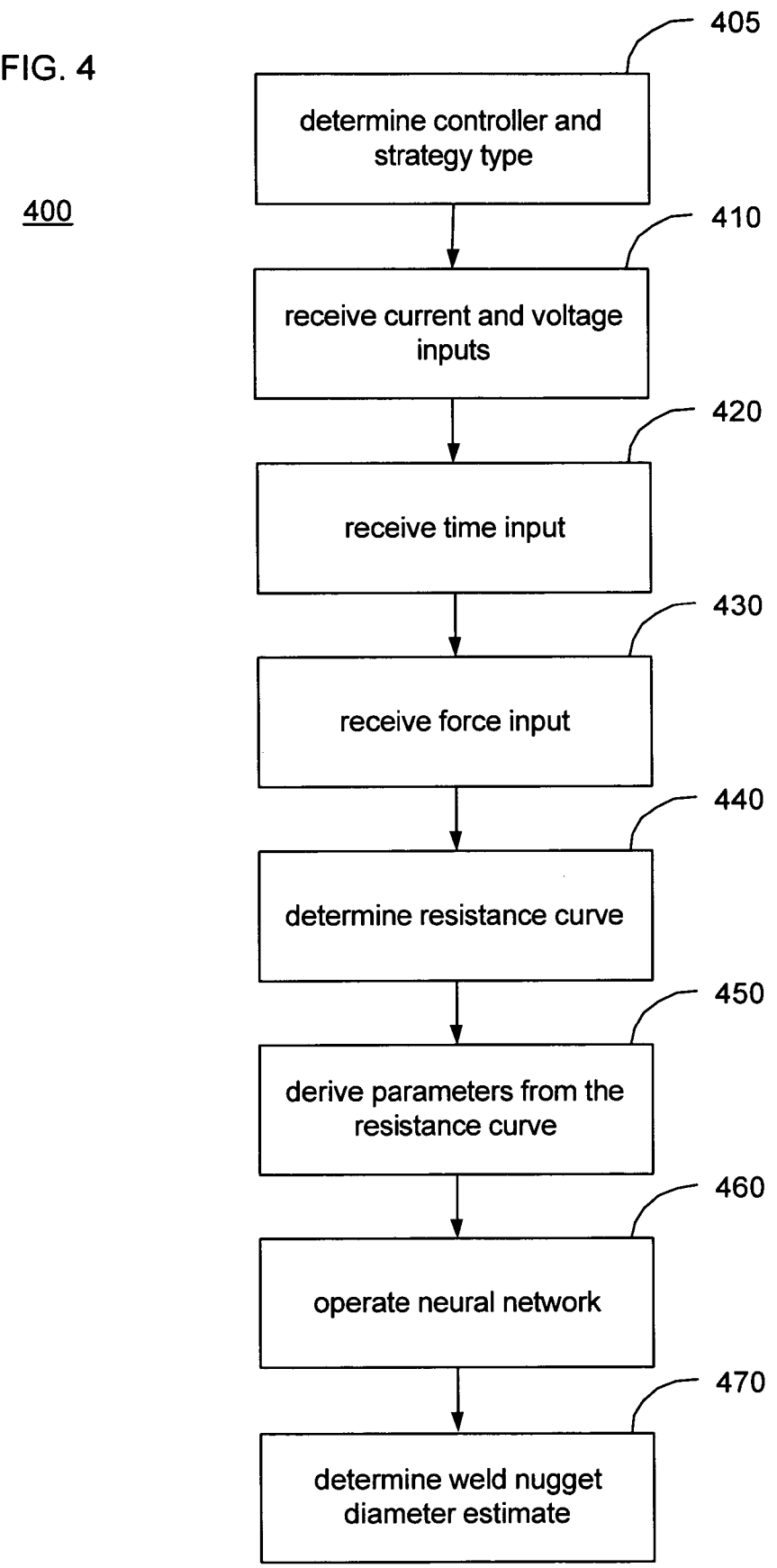
FIG. 4 illustrates an alternative exemplary embodiment of a method for determining a weld nugget diameter estimate in accordance with the present invention.

Accordingly, in one implementation, a computerized method for using a neural network to estimate weld nugget diameter, includes receiving current and voltage inputs, receiving a time input, receiving a force input, determining a resistance curve based on the current and voltage inputs, the time input, and the force input, using the resistance curve, deriving weld parameters, using the weld parameters derived from the resistance curve to operate the neural network; and operating the neural network to provide a nugget diameter output. FIG. 4 illustrates one embodiment of a method 400 for estimating nugget diameters in accordance with one aspect of the invention. Method 400 begins at 405 by determining a controller type and welding strategy. In one embodiment, step 405 is implemented in a similar fashion as step 205 of method 200.

Current and voltage inputs are received in step 410. A time input is received at step 420, a force input is received at step 430, a resistance curve is determined at step 440, and from the resistance curve, parameters are derived in step 450. In one embodiment, step 410 is implemented as in step 310, step 420 is implemented as in step 320, step 430 is implemented as in step 330, step 440 is implemented as in step 440, and step 450 is implemented as in step 350.

A neural network is operated based on the inputs at step 460. Operation of a neural network in step 460 is implemented as in step 360 in one embodiment. In another embodiment, the operation of the neural network is modeled in response to the determination of controller and strategy.

The output layer of the neural network provides the nugget diameter output responsive to the operation of the neural network at 460.

Figure 5:
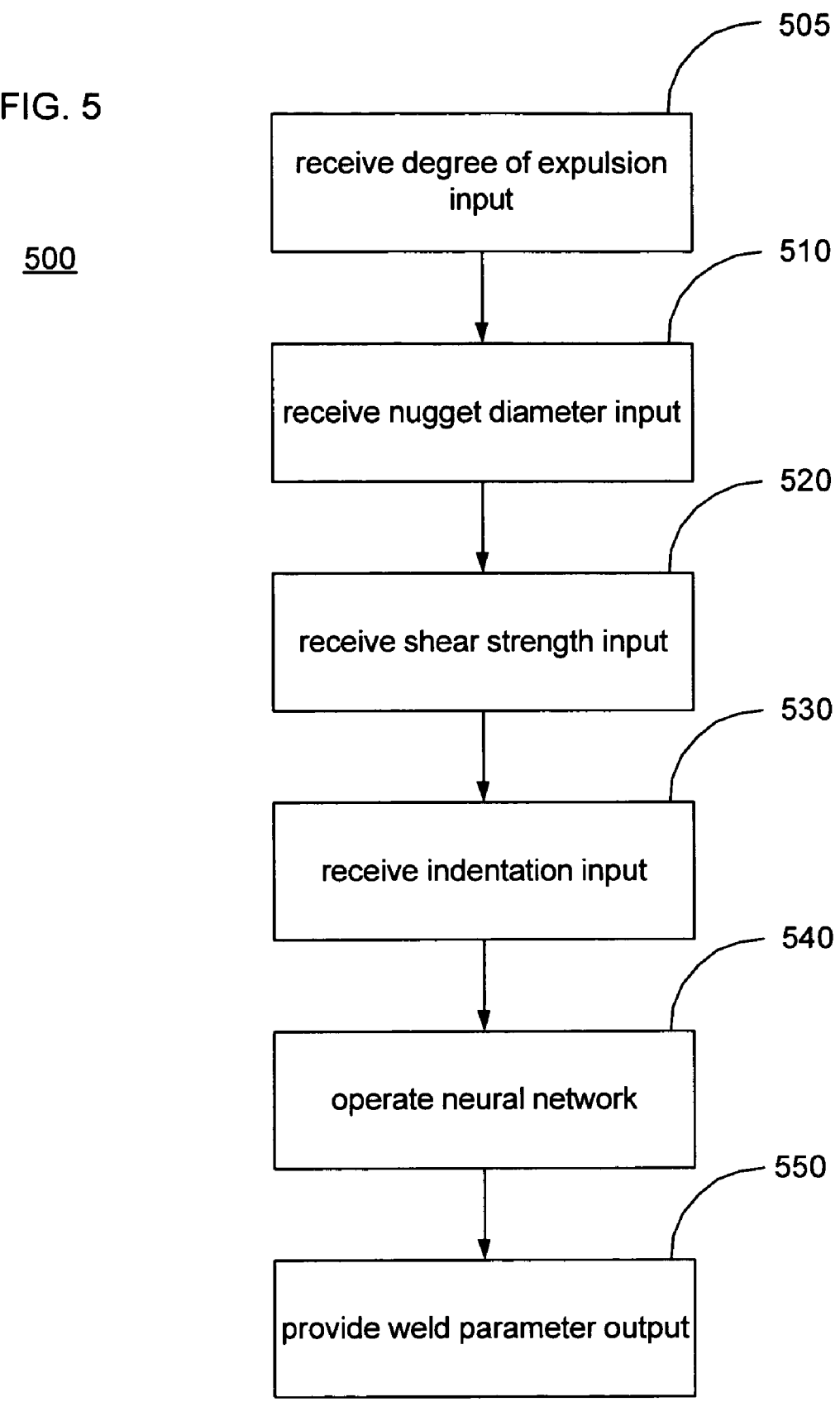
FIG. 5 illustrates an exemplary embodiment of a method for estimating weld parameters in accordance with the present invention.

FIG. 5 illustrates one embodiment of a method 500 for estimating weld parameters in accordance with one aspect of the invention. Method 500 begins at 505 and a degree of expulsion input is received. As used herein, degree of expulsion is a numeric quality identifier qualifying the extent of expulsion from the exterior edge of the weld nugget. In one embodiment, a 4-degree qualifier is used, with a degree of expulsion of 1 indicating no expulsion, a degree of expulsion of 2 indicating only slight expulsion, a degree of expulsion of 3 indicating moderate expulsion, and a degree of expulsion of 4 indicating heavy expulsion. In one embodiment, the degree of expulsion input reflects the maximum allowable degree of expulsion.

A nugget diameter input is received at step 510. A nugget diameter input is an input describing the diameter of the desired nugget. In one embodiment, the nugget diameter input is a minimum acceptable diameter input.

A shear strength input is received at step 520. A shear strength input describes the minimum desirable shear strength for the weld.

An indentation input is received at step 530. An indentation input describes the maximum indentation for the desired weld.

A neural network is operated based on the degree of expulsion, nugget diameter, shear strength and indentation inputs at step 540. In one embodiment, the neural network also utilizes other inputs in addition to the ones mentioned above when referencing step 150 of method 100. These include joint type, the type of material (e.g., bare steel, galvanized steel, aluminum, etc.) to be welded, and stack thickness.

The output layer of the neural network provides the desired weld parameter outputs at step 550. In one embodiment, the weld parameter outputs include current, force, and time.

Figure 6:
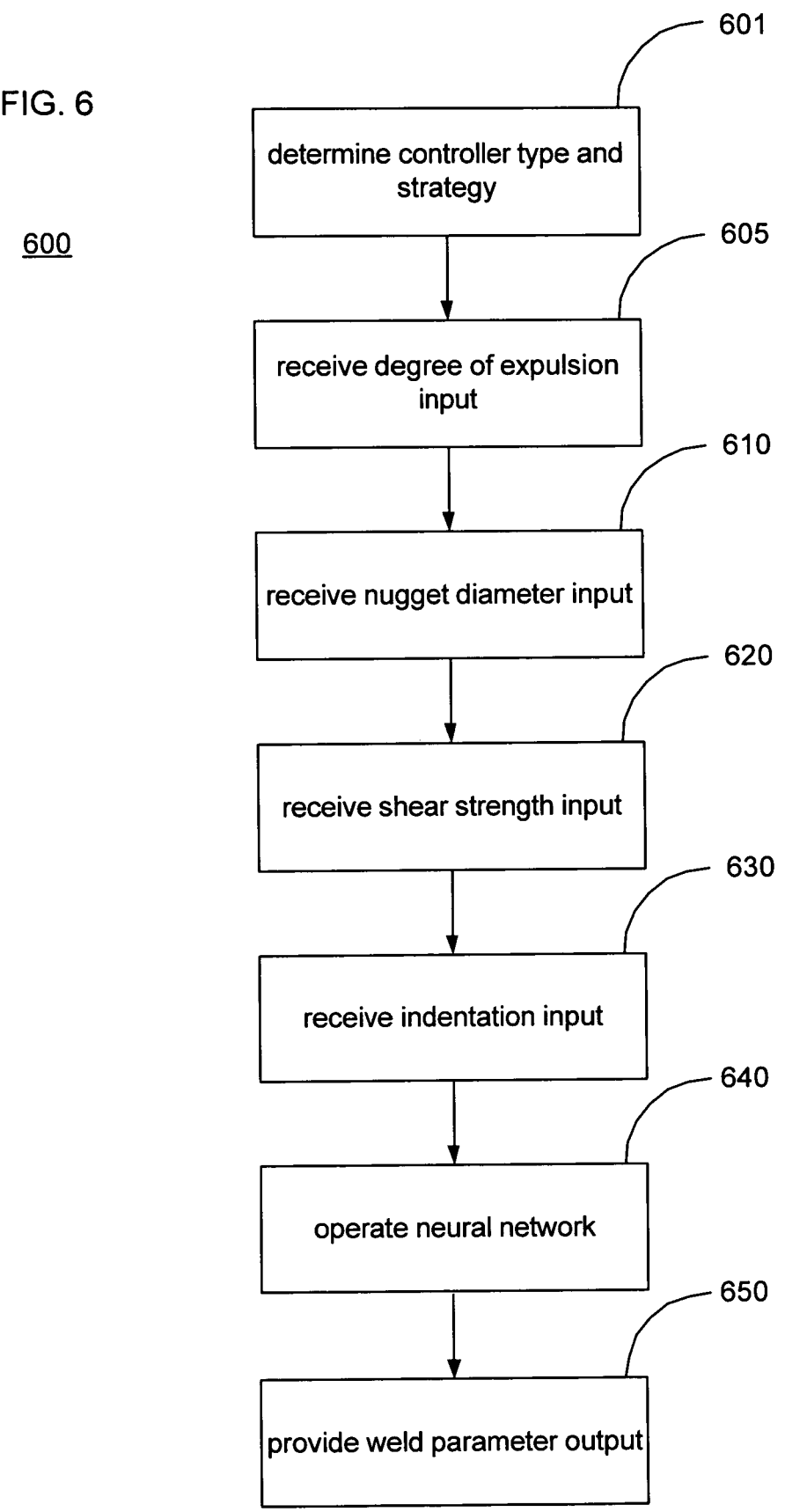
FIG. 6 illustrates an alternative exemplary embodiment of a method for estimating weld parameters in accordance with the present invention.

FIG. 6 illustrates one embodiment of a method 600 for estimating weld parameters in accordance with one aspect of the invention. Method 600 begins at 601 by determining a controller type and welding strategy. In one embodiment, step 601 is implemented in a similar fashion as step 205 of method 200.

A degree of expulsion input is received at step 605, a nugget diameter input is received at step 610, a shear strength input is received at step 620, and an indentation input is received at step 630. In one embodiment, step 605 is implemented as in step 505, step 610 is implemented as in step 510, step 620 is implemented as in step 520, and step 630 is implemented as in step 530.

A neural network is operated based on the inputs at step 640. Operation of a neural network in step 640 is implemented as in step 540 in one embodiment. In another embodiment, the operation of the neural network is modeled in response to the determination of controller and strategy.

The output layer of the neural network provides the weld parameter output responsive to the operation of the neural network at 650. In one embodiment, the weld parameter outputs include current, force and weld time.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for estimating weld nugget diameter, the method comprising:
   receiving current and voltage inputs;
   receiving a time input;
   receiving a force input;
   determining a resistance curve based on the current and voltage inputs, the time input and the force input;
   deriving weld parameters from the resistance curve; and
   determining a weld nugget diameter estimate based on weld parameters derived from the resistance curve.

2. The method of claim 1 further comprising first determining a controller type and control strategy.

3. The method of claim 2 wherein the controller type is selected from the group consisting of alternating current and mid-frequency direct current.

4. The method of claim 2 wherein the control strategy is selected from the group consisting of constant voltage, constant current and constant heat control.

5. The method of claim 2 wherein determining a weld nugget diameter estimate comprises modeling the weld nugget diameter estimate in response to determining a controller type and control strategy.

6. The method of claim 1 wherein the weld parameters derived from the resistance curve are selected from the group consisting of minimum resistance, maximum resistance, time when maximum resistance is attained, the difference between maximum and minimum resistance, the ratio of maximum resistance to initial resistance, area underneath the resistance curve, maximum negative slope of the resistance curve, steady state value of resistance, time require to attain the steady state value of resistance, RMS value of the resistance, and the difference between maximum resistance and steady state value of resistance.

7. The method of claim 1 wherein the weld parameters are selected from the group consisting of type of material, type of stack, stack thickness, weld cap diameter, preheat current, RMS value of weld current, applied force, weld time, weld level, and energy delivered to nugget.

8. The method of claim 1 further comprising estimating the probability of a stick weld by computing a weighted sum of the weld parameters.

9. The method of claim 8 wherein the weld nugget diameter estimate is determined in response to the stick weld probability.

10. The method of claim 1 wherein determining a weld nugget diameter estimate based on parameters derived from the resistance curve comprises a correction factor due to increased cap diameter resulting from the number of welds performed.

11. The method of claim 1 wherein the weld parameters derived from the resistance curve include at least one of minimum resistance, maximum resistance, time when maximum resistance is attained, the difference between the maximum and minimum resistance, the ratio of maximum resistance to initial resistance, steady state value of resistance, time required to attain steady state value of resistance, RMS value of resistance, or the difference between maximum resistance and steady state value of resistance.

12. The method of claim 1 wherein the weld parameters derived from the resistance curve include at least one of type of material, type of stack, stack thickness, weld cap diameter, preheat current, RMS value of weld current, applied force, weld time, weld level, or energy delivered to nugget.

13. A computerized method for using a neural network to estimate weld nugget diameter, the method comprising:
receiving current and voltage inputs;
receiving a time input;
receiving a force input;
determining a resistance curve based on the current and voltage inputs, the time input, and the force input;
using the resistance curve, deriving weld parameters;
using the weld parameters derived from the resistance curve to operate the neural network; and
operating the neural network to provide a nugget diameter output.

14. A computerized method for using a neural network to estimate weld parameters, the method comprising;
receiving a degree of expulsion input;
receiving a nugget diameter input;
receiving a shear strength input;
receiving an indentation input;
using the degree of expulsion input, nugget diameter input, sheer strength input and indentation input to operate the neural network; and
operating the neural network to provide a weld parameter output.

15. The method of claim 14 further comprising first determining a controller type and control strategy.

16. The method of claim 15 wherein operating a neural network comprises:
modeling the neural network in response to the step of determining a controller type and control strategy.

* * * * *